(12) United States Patent  
Kowarz

(10) Patent No.: US 6,807,010 B2
(45) Date of Patent: Oct. 19, 2004

(54) PROJECTION DISPLAY APPARATUS HAVING BOTH INCOHERENT AND LASER LIGHT SOURCES

(75) Inventor: Marek W. Kowarz, Henrietta, NY (US)

(73) Assignee: Eastman Kodak Company, Rochester, NY (US)

(*) Notice: Subject to any disclaimer, the term of this patent is extended or adjusted under 35 U.S.C. 154(b) by 11 days.

(21) Appl. No.: 10/395,678

(22) Filed: Mar. 24, 2003

(65) Prior Publication Data

US 2004/0090679 A1 May 13, 2004

Related U.S. Application Data

(60) Provisional application No. 60/425,896, filed on Nov. 13, 2002.

(51) Int. Cl.[7] ............................ G02B 27/14; G03B 21/00
(52) U.S. Cl. ........................... 359/634; 359/636; 353/31
(58) Field of Search ................................ 359/291–292, 359/629, 634, 636; 353/31, 39, 48

(56) References Cited

U.S. PATENT DOCUMENTS

| | | | |
|---|---|---|---|
| 4,441,791 A | 4/1984 | Hornbeck | |
| 5,311,360 A | 5/1994 | Bloom et al. | |
| 5,521,748 A * | 5/1996 | Sarraf | 359/619 |
| 5,526,063 A | 6/1996 | Joubert et al. | 348/744 |
| 5,535,047 A | 7/1996 | Hornbeck | |
| 5,570,213 A | 10/1996 | Ruiz et al. | |
| 5,600,383 A | 2/1997 | Hornbeck | |
| 5,620,755 A | 4/1997 | Smith, Jr. et al. | |
| 5,719,695 A | 2/1998 | Heimbuch | |
| 5,914,818 A | 6/1999 | Tejada et al. | |
| 5,930,050 A | 7/1999 | Dewald | |
| 6,008,951 A | 12/1999 | Anderson | |
| 6,089,717 A | 7/2000 | Iwai | |
| 6,183,092 B1 | 2/2001 | Troyer | |
| 6,307,663 B1 | 10/2001 | Kowarz | |
| 6,317,170 B1 | 11/2001 | Hwang et al. | |
| 6,323,984 B1 | 11/2001 | Trisnadi | 359/245 |
| 6,411,425 B1 | 6/2002 | Kowarz et al. | |
| 6,426,781 B1 | 7/2002 | Lee | |
| 6,435,682 B1 | 8/2002 | Kaelin et al. | |
| 6,476,848 B2 | 11/2002 | Kowarz et al. | |
| 6,517,211 B2 * | 2/2003 | Mihara | 353/31 |
| 6,594,090 B2 * | 7/2003 | Kruschwitz et al. | 359/634 |
| 6,611,380 B2 * | 8/2003 | Kowarz et al. | 359/291 |
| 6,636,292 B2 * | 10/2003 | Roddy et al. | 355/32 |
| 6,734,889 B2 * | 5/2004 | Ramanujan et al. | 347/239 |
| 2002/0067468 A1 | 6/2002 | O'Connor | 353/231 |
| 2004/0075817 A1 | 10/2002 | Agostinelli et al. | |
| 2002/0154277 A1 | 10/2002 | Mukawa et al. | |

* cited by examiner

Primary Examiner—Georgia Epps
Assistant Examiner—Alicia M. Harrington
(74) Attorney, Agent, or Firm—Steven H. Shaw

(57) ABSTRACT

A color display apparatus for forming, on a display surface, a color image of superimposed color images, the display apparatus having a first color modulation channel for forming a first color two-dimensional image using a laser light source for providing a first color source beam, a linear spatial light modulator for modulating the first color source beam, and a scanning element for scanning the modulated light beam to form a first color two-dimensional image. A second color modulation channel forms a second color two-dimensional image using an incoherent light source for providing a second color source beam to an area spatial light modulator for modulating the second color source beam to form a second color two-dimensional image. A projection lens then projects a superimposed color image of the first color two-dimensional image and the second color two-dimensional image and any third color two-dimensional image.

85 Claims, 11 Drawing Sheets

PROJECTION DISPLAY APPARATUS HAVING BOTH INCOHERENT AND LASER LIGHT SOURCES

CROSS-REFERENCE TO RELATED APPLICATIONS

This is a 111A Application of Provisional Application Ser. No. 60/425,896, filed Nov. 13, 2002.

FIELD OF THE INVENTION

This invention generally relates to display systems that form a two-dimensional image on a display surface and more particularly relates to a color display apparatus using spatial light modulators that are illuminated by light from both incoherent light sources and laser light sources.

BACKGROUND OF THE INVENTION

Currently, promising solutions for digital cinema projection and home theater systems employ, as image forming devices, one of two types of spatial light modulators (SLMs): area SLMs and linear SLMs. An area spatial light modulator has a two-dimensional array of light-valve elements, each element corresponding to an image pixel. Each array element is separately addressable and digitally controlled to modulate transmitted or reflected light from a light source. There are two salient types of area spatial light modulators that are conventionally employed for forming images in digital projection and printing apparatus: Digital Micro-mirror Devices (DMDs) and Liquid-Crystal Devices (LCDs).

Prototype projectors using one or more DMDs have been demonstrated. DMD devices are described in a number of patents, for example U.S. Pat. No. 4,441,791 by Hornbeck, issued Apr. 10, 1984, titled "Deformable Mirror Light Modulator," U.S. Pat. No. 5,535,047 by Hornbeck, issued Jul. 9, 1996, titled "Active Yoke Hidden Hinge Digital Micromirror Device," U.S. Pat. No. 5,600,383 by Hornbeck, issued Feb. 4, 1997, titled "Multi-Level Deformable Mirror Device with Torsion Hinges Placed In A Layer Different From The Torsion Beam Layer," and U.S. Pat. No. 5,719,695 by Heimbuch, issued Feb. 17, 1998, titled "Spatial Light Modulator With Superstructure Light Shield." Optical designs for projection apparatus employing DMDs are disclosed in U.S. Pat. No. 5,914,818 by Tejada et al., issued Jun. 22, 1999, titled "Offset Projection Lens For Use With Reflective Spatial Light Modulators," U.S. Pat. No. 5,930,050 by Dewald, issued Jul. 27, 1999, titled "Anamorphic Lens For Providing Wide-Screen Images Generated By A Spatial Light Modulator," U.S. Pat. No. 6,008,951 by Anderson, issued Dec. 28, 1999, titled "Offset Projection Zoom Lens With Fixed Rear Group For Reflective Spatial Light Modulators," and U.S. Pat. No. 6,089,717 by Iwai, issued Jul. 18, 2000, titled "Projector Apparatus." LCD apparatus are described, in part, in U.S. Pat. No. 5,570,213 by Ruiz et al., issued Oct. 29, 1996, titled "Liquid Crystal Light Valve With Minimized Double Reflection" and U.S. Pat. No. 5,620,755 by Smith, Jr. et al., issued Apr. 15, 1997, titled "Inducing Tilted Perpendicular Alignment In Liquid Crystals." Conventionally, area SLMs are provided filtered source illumination from a lamp or other broadband source. LCDs may be of either the reflective type (Liquid-Crystal On Silicon, or LCOS) or the transmissive type.

Linear SLMs, which could also be considered as one-dimensional spatial light modulators, have some advantages over the two-dimensional LCD and DMD area spatial light modulators described above. Inherent performance advantages for linear modulator arrays include the capability for higher resolution, reduced cost, and simplified illumination optics. In addition, linear arrays are more suitable modulators for laser light than are their two-dimensional counterparts. Grating Light Valve (GLV) linear arrays, as described in U.S. Pat. No. 5,311,360 by Bloom et al., issued May 10, 1994, titled "Method And Apparatus For Modulating A Light Beam" are one earlier type of linear modulator array that offers a workable solution for high-brightness imaging using laser sources, for example.

Recently, an electromechanical conformal grating device consisting of ribbon elements suspended above a substrate by a periodic sequence of intermediate supports was disclosed by Kowarz in commonly assigned U.S. Pat. No. 6,307,663, issued Oct. 23, 2001, titled "Spatial Light Modulator With Conformal Grating Device." The electromechanical conformal grating device is operated by electrostatic actuation, which causes the ribbon elements to conform around the support substructure, thereby producing a grating. The device of '663 has more recently become known as the conformal GEMS device, with GEMS standing for Grating ElectroMechanical System. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated throughout most of an optical system, providing a high degree of system flexibility and allowing the use of lower cost optics. When used with laser sources, GEMS devices provide excellent brightness, speed, and contrast.

Commonly assigned U.S. Pat. No. 6,411,425, issued Jun. 25, 2002, titled "Electromechanical Grating Display System With Spatially Separated Light Beams" and commonly assigned U.S. Pat. No. 6,476,848, issued Nov. 5, 2002, titled "Electromechanical Grating Display System With Segmented Waveplate," (both to Kowarz et al.) disclose imaging systems employing GEMS devices in a number of printing and display embodiments. As with its GLV counterpart, a GEMS device modulates a single color and a single line of an for sequencing illumination and modulation data for each color to a single linear modulator or for combining separately modulated color images.

Among the recognized advantages of digital projection display employing spatial light modulators is an expanded color gamut, which allows displayed images to have improved color fidelity and appearance over images provided by conventional film-based or CRT-based projection systems. Color gamut is most readily visualized using the familiar tristimulus CIE color model developed by Commission Internationale de l'Eclairage (International Commission on Illumination), which shows the color space perceived by a standard human observer. FIG. 1a shows the CIE color model, which represents a visible gamut 200 as a familiar "horseshoe" curve. Pure, saturated spectral colors are mapped to the "horseshoe" shaped periphery of visible gamut 200. The interior of the "horseshoe" then contains all mappings of mixtures of colors, including mixtures of pure colors with white, such as spectral red with added white, which becomes pink, for example. Within visible gamut 200, a device gamut 202 is typically represented by a triangle, with vertices approaching the curve of visible gamut 200. In FIG. 1a, device gamut 202, as drawn, approximates the familiar gamut for standard SMPTE (Society of Motion Picture and Television Engineers) phosphors, for example.

As is well known in the color projection arts, it is desirable for a display device to provide as much of visible gamut 200 as possible in order to faithfully represent the actual color of an image and to provide vivid colors. The component colors of a display, typically Red, Green, and Blue (RGB) define the vertices of the polygon for device gamut 202, thereby defining the area and shape of device gamut 202.

One basic strategy, then, to increase the size of device gamut 202 is to use light sources that are spectrally pure, or have at least a high degree of spectral purity. Lasers, due to their inherent spectral purity, are particularly advantaged for maximizing device gamut 202. Substantially monochromatic, laser sources effectively position vertices of device gamut 202 onto the periphery of visible gamut 200.

A number of digital projector designs have been proposed for taking advantage of the favorable spectral qualities of laser sources. For example, U.S. Pat. No. 6,183,092 by Troyer, issued Feb. 6, 2001, titled "Laser Projection Apparatus With Liquid-Crystal Light Valves And Scanning Reading Beam," U.S. Pat. No. 6,426,781 by Lee, issued Jul. 30, 2002, titled "Laser Video Projector," U.S. Pat. No. 6,435,682 by Kaelin et al., issued Aug. 20, 2002, titled "Laser Imaging Using A Spatial Light Modulator," and U.S. Pat. No. 6,317,170 by Hwang et al., issued Nov. 13, 2001, titled "Large Screen Compact Image Projection apparatus Using A Hybrid Video Laser Color Mixer" show just a few of the proposed approaches for digital projection using laser illumination sources. Designs such as those disclosed in the patents just listed take advantage of continuing advances in laser design and fabrication that provide increased power, improved lifetimes, and overall lower cost for laser illumination solutions.

However, in spite of significant advances, the lack of low-cost lasers in the visible blue spectrum remains a problem. Laser manufacturers have, as yet, been unable to provide blue lasers at reasonable cost in the power range needed for digital projection. In fact, the cost of lasers available in the visible blue spectrum can be as much as ten times the cost of green lasers at the needed power levels. To a somewhat lesser extent, the problem of cost and availability also affects red lasers in some power ranges, particularly those providing illumination for large screen projection. This problem, then, dramatically impacts the cost of a projection apparatus, making laser projection an unlikely near-term alternative for wide acceptance with projection systems.

While lasers provide light that is spectrally pure and therefore allow an enlarged color gamut, there are other characteristics of laser light that are less than favorable for digital projection. Notably, laser light is at least relatively coherent and can be highly coherent. As a result, speckle and other effects are a problem for digital projection devices using laser illumination. As is noted above, area spatial light modulators, particularly transmissive and reflective LCDs, although they perform well with conventional incoherent light sources, such as lamps and LEDs, are not well-suited for modulation of laser light. Instead, linear spatial light modulators, such as GLV and GEMS devices are preferred for use with laser illumination.

In general, incoherent light sources are not as constrained as are lasers with respect to blue wavelengths. For example, mercury arc lamps, widely available at the necessary power range for projection, radiate light in the visible blue range. In fact, the standard 436 nm line of mercury arc lamps provides a characteristic blue spectral component that is sharply defined. This allows a filter to be used to isolate and pass only this visible blue component. Thus, the mercury arc lamp can serve as an incoherent light source, providing light that is substantially spectrally pure, within the range of wavelengths that are not affordably achievable using lasers.

LEDs, while not as spectrally pure nor as bright as lasers, provide yet another possible low-cost incoherent illumination source for digital projection systems with small screens. LEDs can provide favorable solutions for some types of display apparatus, particularly since these devices are becoming more widely available at the needed wavelengths.

It is worthwhile to summarize these considerations for illumination sources in digital projection apparatus design:

(a) lasers, providing optimal color gamut and high brightness, work best with linear SLMs to provide high resolution, but may not currently be affordable at all needed wavelengths, particularly in the visible blue region;

(b) incoherent light sources, such as lamp and LED light sources, may not provide as broad a color gamut as lasers at comparable wavelengths. Incoherent light sources work best with area SLMs used at relatively lower resolution, and are available at wavelengths across the visible spectrum, where lasers are not currently affordable;

It is recognized in the digital projection apparatus design arts that contesting factors of different color gamut, SLM type, resolution, and wavelength represent a fork in the road. The decision to use either a laser-based illumination system or an illumination system using incoherent light sources, such as the more conventional lamp, dictates how the designer then proceeds subsequently in order to optimize apparatus performance and value.

Because light handling optics and image modulation methods differ significantly between laser-based illumination systems and other types, hybrid solutions do not appear to be attractive or even viable. As one type of hybrid solution, U.S. Patent Application Publication No. 2002/0154277 by Mukawa et al., published Oct. 24, 2002, titled "Image Display Device" discloses an image display device in which a laser is added to a conventional lamp-based illumination system in order to supplement the available brightness at a specific wavelength. Notably, the system disclosed in the Mukawa et al. application uses the same type of spatial light modulator for modulation of both laser light and incoherent light from a lamp. However, this approach neither takes advantage of special properties of laser light for modulation nor compensates for imaging anomalies caused by coherent laser light when used with SLMs optimized for conventional light sources.

As is well known, a projected color image comprises a Red color image, a Green color image, and a Blue color image, superimposed, collectively termed an RGB image. The displayed color image has a certain resolution, typically expressed in terms of the number of horizontal and vertical pixels. In order to form the RGB image at the desired resolution, individual pixels within each red, green, and blue color plane are aligned to each other. Thus, using conventional approaches, each color plane, and each SLM corresponding to a color plane, have the same resolution.

It is known that the human eye, which combines the separate red, green, and blue pixels displayed in order to perceive composite colors, has different sensitivity to different colors. Green sensitivity, for example, is very high;

the green color channel corresponds most closely to human perception of luminance. There is less sensitivity to red, and even less to blue. In fact, with particular respect to detail perception, the human eye is relatively insensitive to blue. That is, the actual resolution of the blue color channel is of relatively minor importance for perception of detail. For a displayed image, this effect can be shown dramatically by decreasing the resolution of only the blue image plane while maintaining the original resolution of the red and green color planes. Although the relative insensitivity of the human eye to blue for discerning detail is well-documented, conventional digital projection designs have failed to take advantage of this characteristic to ease design constraints, to benefit from expanded color gamut, and to provide, at the same time, lower cost projection devices.

SUMMARY OF THE INVENTION

The aforementioned needs and shortcomings are met by the present invention by providing an improved digital projector solution that employs different types of illumination and image-forming components on different color channels. With this solution in mind, the present invention provides a display apparatus for forming, on a display surface, a color image including a plurality of superimposed images, the display apparatus includes:

(a) a first color modulation channel for forming a first color two-dimensional image, comprising:
  (a1) a laser light source for providing a first color source beam;
  (a2) a linear spatial light modulator for modulating said first color source beam to provide a modulated light beam having a first color;
  (a3) a scanning element for scanning said modulated light beam having said first color to form said first color two-dimensional image;

(b) a second color modulation channel for forming a second color two-dimensional image, comprising:
  (b1) an incoherent light source for providing a second color source beam;
  (b2) an area spatial light modulator for modulating said second color source beam to form a second color two-dimensional image; and (c) at least one projection lens for projecting, toward the display surface, the color image comprising said first color two-dimensional image superimposed with said second color two-dimensional image.

Another aspect of the present invention provides a system for forming, on a display surface, a color image including a plurality of superimposed images, the system includes:

(a) a first color modulation channel for forming a first two-dimensional image, comprising:
  (a1) means for providing a source laser beam;
  (a2) means for modulating said source laser beam to provide at least one modulated light beam having a first color;
  (a3) means for directing, toward a color combiner, a scanned line image beam including said at least one modulated light beam having said first color;

(b) a second color modulation channel for forming a second two-dimensional image, comprising:
  (b1) means for providing a second color incoherent source beam;
  (b2) means for modulating said second color incoherent source beam to provide a second color image beam to said color combiner;

(c) said color combiner combining at least said scanned line image beam and said second color image beam to form a superimposed color image beam;

(d) means for projecting said superimposed color image beam toward the display surface.

A third aspect of the present invention provides a method for forming, on a display surface, a color image as a plurality of superimposed images, including the steps of:

(a) forming a first color linear image beam including the steps of:
  (a1) providing a first color laser source beam;
  (a2) modulating said first color laser source beam to provide at least one diffracted light beam having a first color;

(b) forming a second color two-dimensional image beam including the steps of:
  (b1) providing a second color source beam from an incoherent light source;
  (b2) modulating said second color source beam;

(c) combining said first color linear image beam with said second color two-dimensional image beam to form a superimposed image beam; and (d) projecting said superimposed image beam toward the display surface.

Advantages

A feature of the present invention is the use of a combination of different types of illumination sources and different types of spatial light modulators within the same display apparatus.

It is an advantage of the present invention that it obviates the need for obtaining lasers at specific wavelengths in the visible region, particularly in the blue region. The present invention provides methods for using incoherent light sources as well as laser sources.

It is a further advantage of the present invention that it allows a display apparatus to use lasers on any number of color channels, where lasers are the most suitable and economical, for example, and to use other light sources where they can be most advantageous.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art. Thus, the present invention provides a display apparatus and method for using a combination of laser and incoherent light sources for forming a two-dimensional color image on a display surface.

For the description that follows, components specific to a single color path may be more particularly identified with a letter appended to the part number. Where used, letters correspond to color paths; for example, "r" is appended for red, "b" for blue, "g" for green. Where shown, "bg" indicates a fourth color path, which could be blue-green, yellow, yellow-green, orange, or some other suitable color, as is described subsequently.

Overall Model

Figure 2:
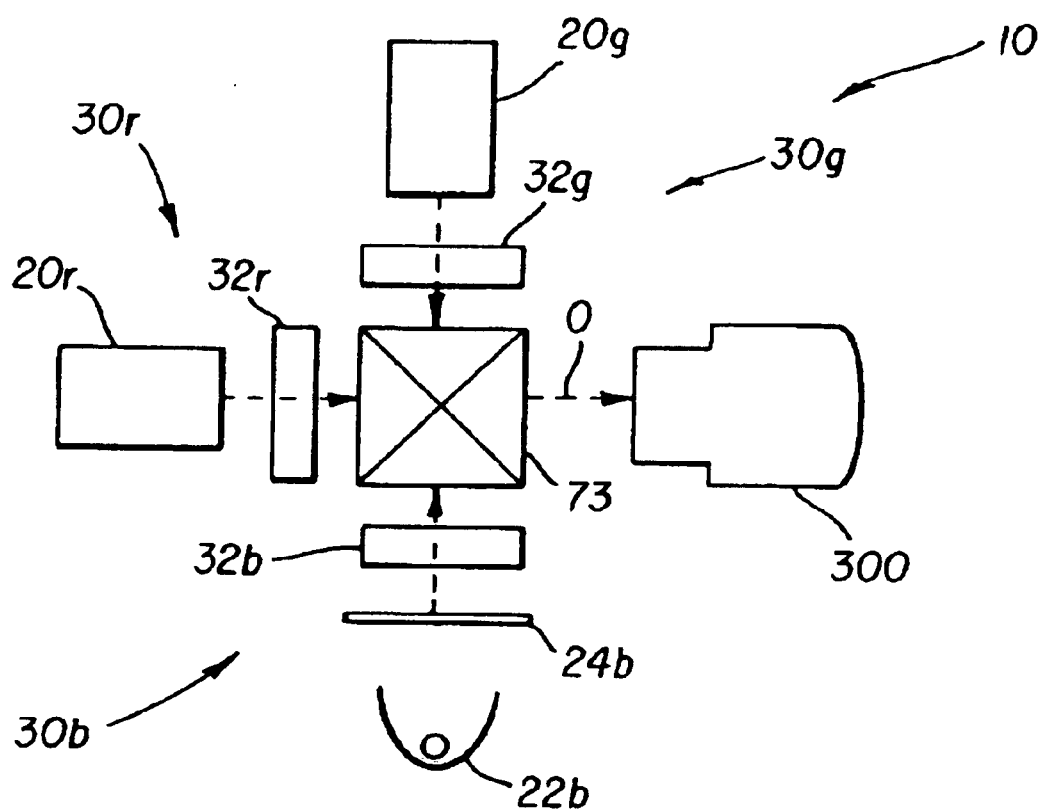
FIG. 2 is a schematic block diagram showing the overall arrangement of image modulation components in a display apparatus of the present invention.

FIG. 2, is a block diagram showing the major components of a display apparatus 10 in a simplified embodiment of the present invention. Regarding the present invention, multiple resolution delivered by multiple color modulation channels, as components of display apparatus 10 shown in FIG. 2, will differ in pixel resolution substantially; contrary to prior art schemes. Display apparatus 10 comprises at least three color modulation channels: a red color modulation channel 30r; a green color modulation channel 30g; and a blue color modulation channel 30b. Red color modulation channel 30r comprises a red laser 20r and a spatial light modulator 32r. Similarly, green color modulation channel 30g comprises a green laser 20g and a spatial light modulator 32g. Blue color modulation channel 30b comprises an incoherent light source 22b, a blue-pass filter 24b that serves as a color separator, and a spatial light modulator 32b. A color combiner 73, such as an X-cube or Philips prism, combines the modulated light from each color modulation channel 30r, 30g, and 30b to provide multicolor modulated light along a single output axis O to a projection lens 300.

In conventional laser-based projection system designs, a laser, a highly coherent light source, would be used in each color modulation channel 30r, 30g, and 30b. The arrangement of display apparatus 10 shown in FIG. 2, however, substitutes an incoherent light source 22b in blue color modulation channel 30b instead of the expected laser. Incoherent light source 22b is preferably a mercury arc lamp or other type of lamp. A well known version of mercury arc lamp, for example, outputs a stable and significant 436 nm wavelength output that can be passed through blue-pass filter 24b to provide illumination for spatial light modulator 32b. An alternate arrangement could use a blue LED or an array comprising multiple blue LEDs as an incoherent light source; for such an alternate arrangement, blue-pass filter 24b would not be necessary. By using an alternate, non-laser, incoherent source for blue illumination, the arrangement of FIG. 2 provides the advantages of laser projection for red and green color modulation channels 30r and 30g, respectively. However, for blue color modulation channel 30b, the high cost of a blue laser source is avoided, while enough light is provided for forming a multicolor image.

In one embodiment, red laser 20r would be a semiconductor laser having a wavelength preferably between about 630 nm and 660 nm. Green laser 20g would be a 532 nm diode-pumped solid state laser with frequency doubling for obtaining the desired emission wavelength. Spatial light modulators 32r, 32g, and 32b could be of the same type, such as some type of transmissive LCD modulator, as is shown for spatial light modulators 32r and 32g in FIG. 2, for example. However, as is described in greater detail subsequently, spatial light modulators 32r, 32g, and 32b can be of different types, selected to suit the type of illumination.

Apparatus Using Linear and Area Spatial Light Modulators

Figure 3A:
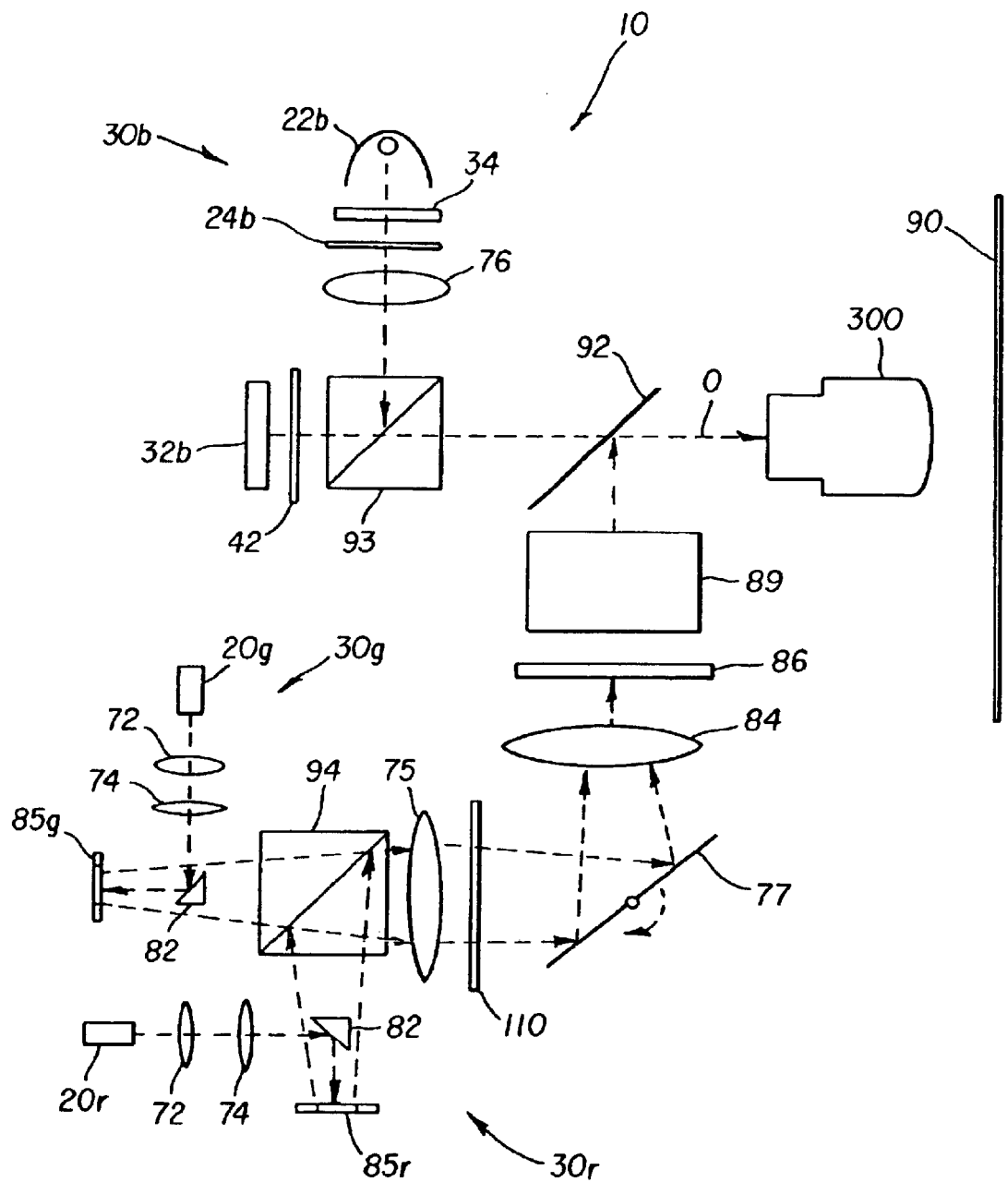
FIG. 3a is a detailed schematic block diagram showing a first embodiment of a display apparatus using a combination of different types of modulation components, wherein the blue modulation path utilizes a reflective LCD spatial light modulator.

Following the model presented in FIG. 2, FIGS. 3a, 3b, 3c, 3d, 3e, 3f, 4, 5, and 6 show various embodiments of display apparatus 10 using combinations having different types of spatial light modulators. Referring to FIG. 3a, there is shown an embodiment wherein red and green color modulation channels 30r and 30g, respectively, modulate laser light at an electromechanical grating light modulator 85r and 85g, such as a linear array of conformal GEMS, for example. Blue color modulation channel 30b, on the other hand, uses an area spatial light modulator 32b.

Referring to FIG. 3a, in red color modulation channel 30r, red laser 20r provides illumination that is conditioned through a spherical lens 72 and a cylindrical lens 74 and directed towards a turning mirror 82. Light reflected from turning mirror 82 is modulated by diffraction at an electromechanical grating light modulator 85r. Modulated diffracted light from electromechanical grating light modulator 85r is diffracted past turning mirror 82 and to a dichroic combiner 94. The modulated light from dichroic combiner 94 is then directed by a lens 75, through an optional cross-order filter 110, to a scanning mirror 77. Turning mirror 82 acts as an obstructing element for the zeroeth order reflected light from electromechanical grating light modulator 85r.

As scanning mirror 77 rotates, individual modulated line images from electromechanical grating light modulator 85r, directed through a scan lens 84 and to an optional moving diffuser 86 (for speckle compensation), are provided to a dichroic combiner 92. Dichroic combiner 92 then directs the modulated line images from scanning mirror 77 along output axis O to projection lens 300, which projects the image onto a display surface 90. An optical compensation element 89 may be disposed in the path of red and green modulated light, when necessary, to make the red/green and blue light paths similar for projection lens 300, thereby reducing image aberrations. It should be noted that the scanned line images from green and red color modulation channels 30g and 30r, respectively, are perceived by a viewer as two-dimensional images when the scan refresh rate is sufficiently high, typically at least 48 Hz.

The path of modulated light from green color modulation channel 30g is similar to the path for red modulated light, just described. Dichroic combiner 94 combines the red and green modulated light and directs the combined light toward scanning mirror 77.

Still referring to FIG. 3a, the operation of blue color modulation channel 30b differs from that described for red and green color modulation channels 30r and 30g. Incoherent light from light source 22b is filtered at bluepass filter 24b and polarized at optional polarizer 34, then directed by a lens 76 to a polarizing beamsplitter 93. Polarizing beamsplitter 93 directs light having the proper polarization through an optional quarter-wave plate 42 and to spatial light modulator 32b. Unlike linear spatial light modulators 32r and 32g, spatial light modulator 32b for blue color modulation channel 30b is an area spatial light modulator, a reflective LCD in the embodiment shown in FIG. 3a. Modulated light from spatial light modulator 32b is then transmitted through polarizing beamsplitter 93 and to dichroic combiner 92, which combines the blue modulated light with red and green modulated light for projection. It is instructive to note that spatial light modulator 32b could alternately be a transmissive LCD, a DMD, or some other type of area spatial light modulator, with the necessary changes to supporting optics, as is well known in the imaging arts.

With the arrangement of FIG. 3a, then, the blue color component from spatial light modulator 32b is a two-dimensional image; the red and green color components from spatial light modulators 85r and 85g, respectively, are scanned line images that form a two-dimensional image with sufficient scan rate, as noted above. Moreover, because of reduced eye sensitivity to blue, as noted in the background section above, the two-dimensional blue image from spatial light modulator 32b may even be at a significantly lower resolution (that is, having fewer displayed pixels over the same area) than the corresponding scanned line image from spatial light modulators 85r and 85g. It is important to note that the size and shape of the two-dimensional blue image should be substantially equal to that for the red and green scanned line images. By proper lens design, lens 75 and scan lens 84 could be used to match the size and shape of the red and green scanned line images to that of the two-dimensional blue image. Any residual mismatch in color image sizing could be adjusted in the mapping of electronic image data to spatial light modulators 85r, 85g, and 32b, as necessary.

Figure 3B:
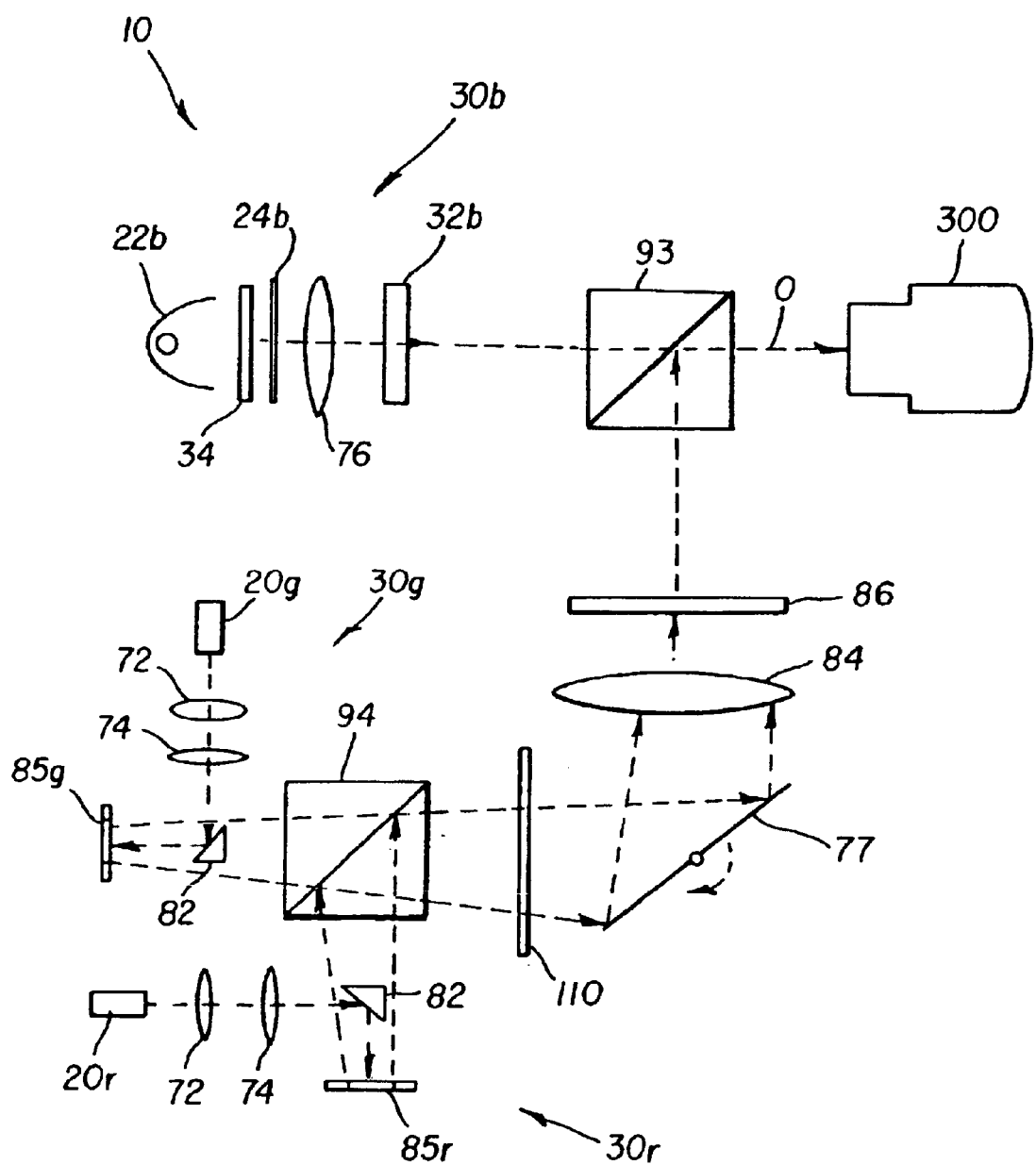
FIG. 3b is a detailed schematic block diagram showing an alternate embodiment of a display apparatus using a combination of different types of modulation components, wherein the blue modulation path utilizes a transmissive LCD spatial light modulator.

FIG. 3b shows an alternate embodiment of display apparatus 10 utilizing a transmissive LCD as an area spatial light modulator 32b in blue color modulation channel 30b. Light from light source 22b is directed through polarizer 34 and blue-pass filter 24b to provide polarized blue light, which is directed through lens 76 to area spatial light modulator 32b. Modulated light from spatial light modulator 32b then travels to polarizing beamsplitter 93, which serves both to select the desired polarization of the blue modulated light and to combine the blue modulated light with red and green modulated light for projection. Red and green color modulation channels 30r and 30g, respectively, in FIG. 3b use linear spatial light modulators 85r and 85g, respectively, in the same manner as described with reference to FIG. 3a.

Figure 3C:
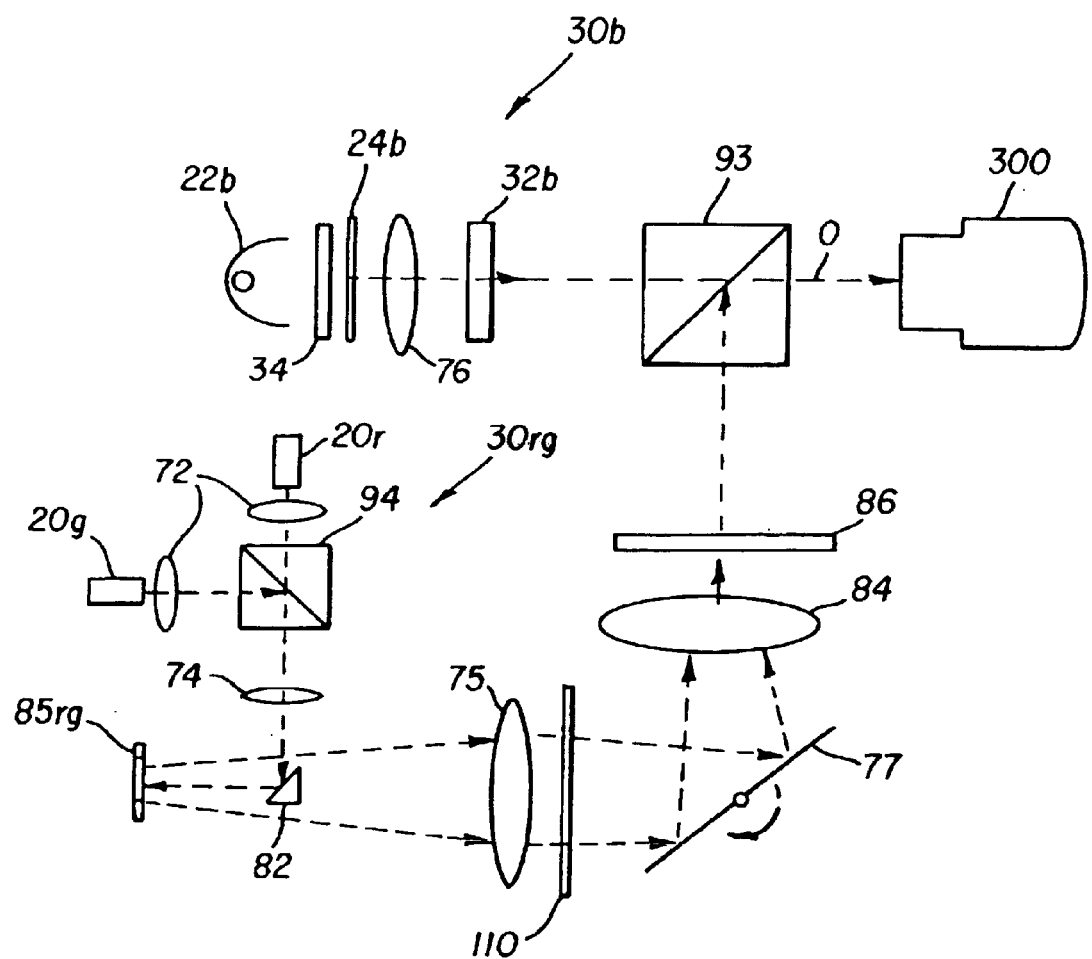
FIG. 3c is a detailed schematic block diagram showing an alternate embodiment of a display apparatus, wherein the blue modulation path utilizes a transmissive LCD spatial light modulator and a second modulation path utilizes a GEMS linear spatial light modulator to provide the two other colors in sequence, from laser sources.

FIG. 3c shows an alternative embodiment having a red-green color modulation channel 30rg in which a single electromechanical grating light modulator 85rg serves to alternately modulate both red and green light, in sequential fashion. Red and green illumination are provided by laser sources 20r and 20g that provide, along the same illumination path, a red laser beam and a green laser beam. These different beams could be combined in any of a number of ways well known in the imaging arts, such as using dichroic combiner 94.

Figure 3D:
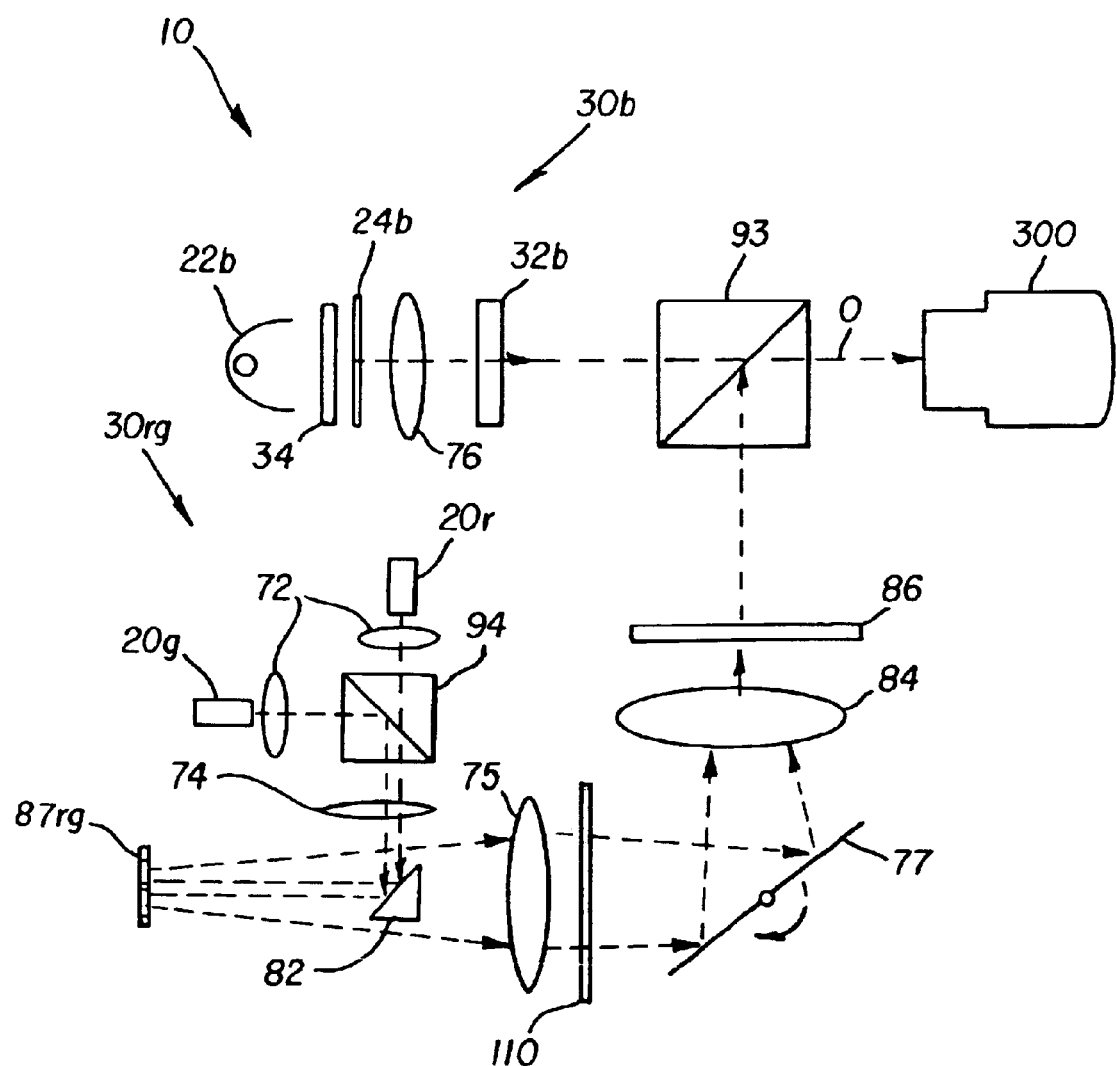
FIG. 3d is a detailed schematic block diagram showing an alternate embodiment of a display apparatus, wherein the blue modulation path utilizes a transmissive area spatial light modulator and a second modulation path utilizes two GEMS linear spatial light modulators, fabricated on the same substrate as a single component, to provide the two other colors, with illumination from laser sources having different spatial displacement.

FIG. 3d shows another alternative embodiment of display apparatus 10 in which red-green color modulation channel 30rg uses a dichroic combiner 94 to direct red and green laser light simultaneously to a dual electromechanical grating light modulator 87rg. Dual electromechanical grating light modulator 87rg provides, as a single component, two independently addressable linear arrays of electromechanical grating devices fabricated onto the same substrate. Spatial displacement, such as with laser illumination provided through dichroic combiner 94, or angular displacement could be used to direct the laser light along separate paths for modulation. With the arrangement of FIG. 3d, dual electromechanical grating light modulator 87rg is capable of simultaneously modulating the red and green light, using two separate linear arrays of electromechanical grating devices, for example.

Figure 3E:
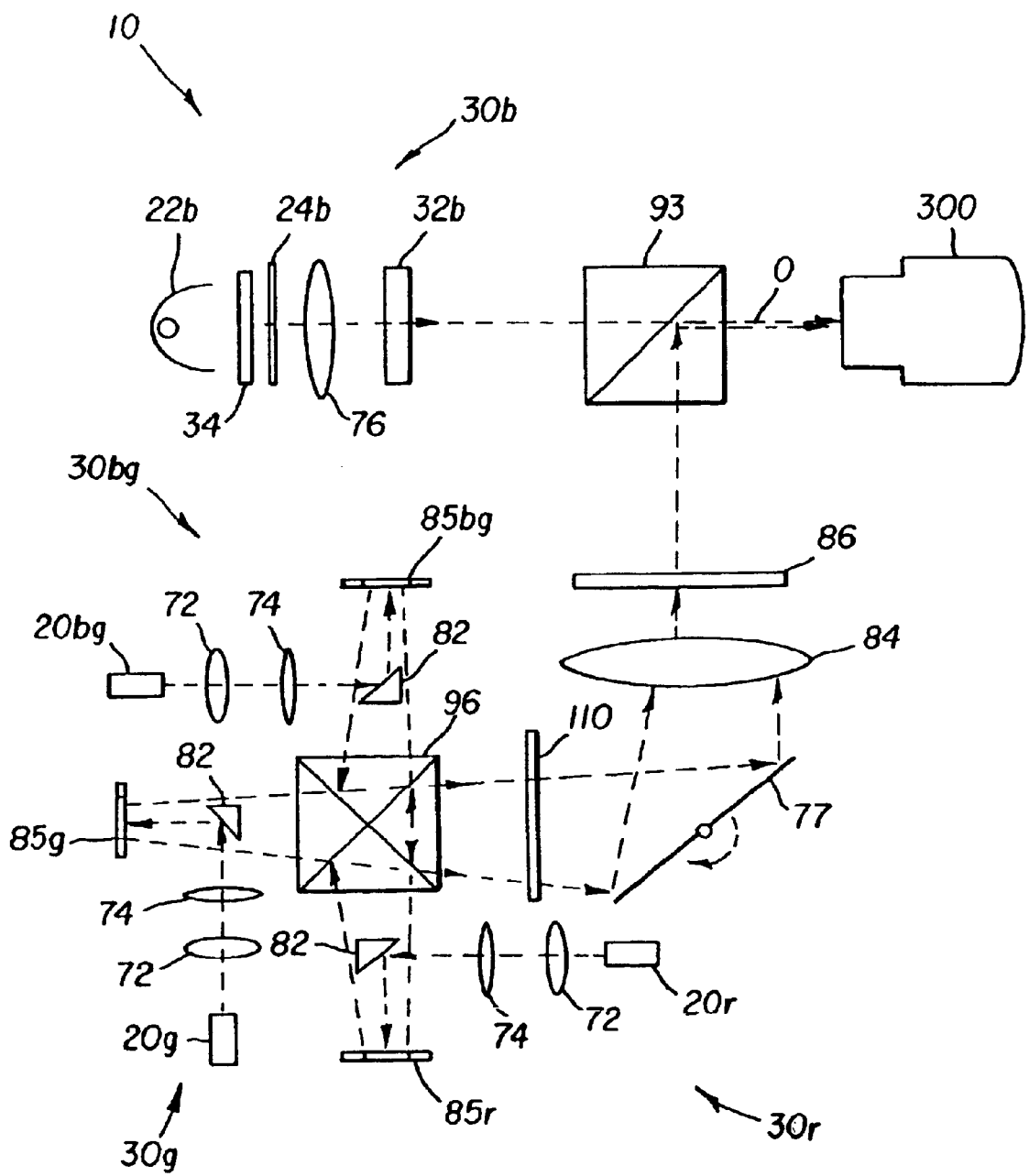
FIG. 3e is a detailed schematic block diagram showing an alternate embodiment of a display apparatus for expanded color gamut, wherein the blue modulation path utilizes a transmissive LCD spatial light modulator and a second modulation path utilizes three or more other lasers providing source illumination to GEMS linear spatial light modulators.

FIG. 3e shows a four-color embodiment of display apparatus 10. An X-cube 96 is used to combine the modulated light from red and green color modulation channels 30r and 30g with modulated light from a fourth color modulation channel 30bg. An electromechanical grating light modulator 85bg modulates the fourth color beam from laser source 20bg. In one four-color embodiment, laser source 20bg emits blue-green light; however, other wavelengths could be employed. In addition, alternative arrangements of color modulation channels 30r, 30g, 30b, and 30bg could include pairing two channels that use area spatial light modulators, such as blue area spatial light modulator 32b and a fourth color area spatial light modulator (not shown) and two channels that use linear spatial light modulators such as electromechanical grating light modulators 85r and 85g. Conventional techniques, well known in the digital imaging arts, would be employed for modulating the fourth color. These could include, for example, using a single area spatial light modulator 32b or a fourth color area spatial light modulator to alternate between modulating two colors. Components such as color filter wheels or dichroic color separators could be used in cooperation with a single incoherent light source, for example, for obtaining the unmodulated color light beams for modulation at spatial light modulator 32b or the fourth color area spatial light modulator, using methods well known in the digital imaging arts.

Figure 3F:
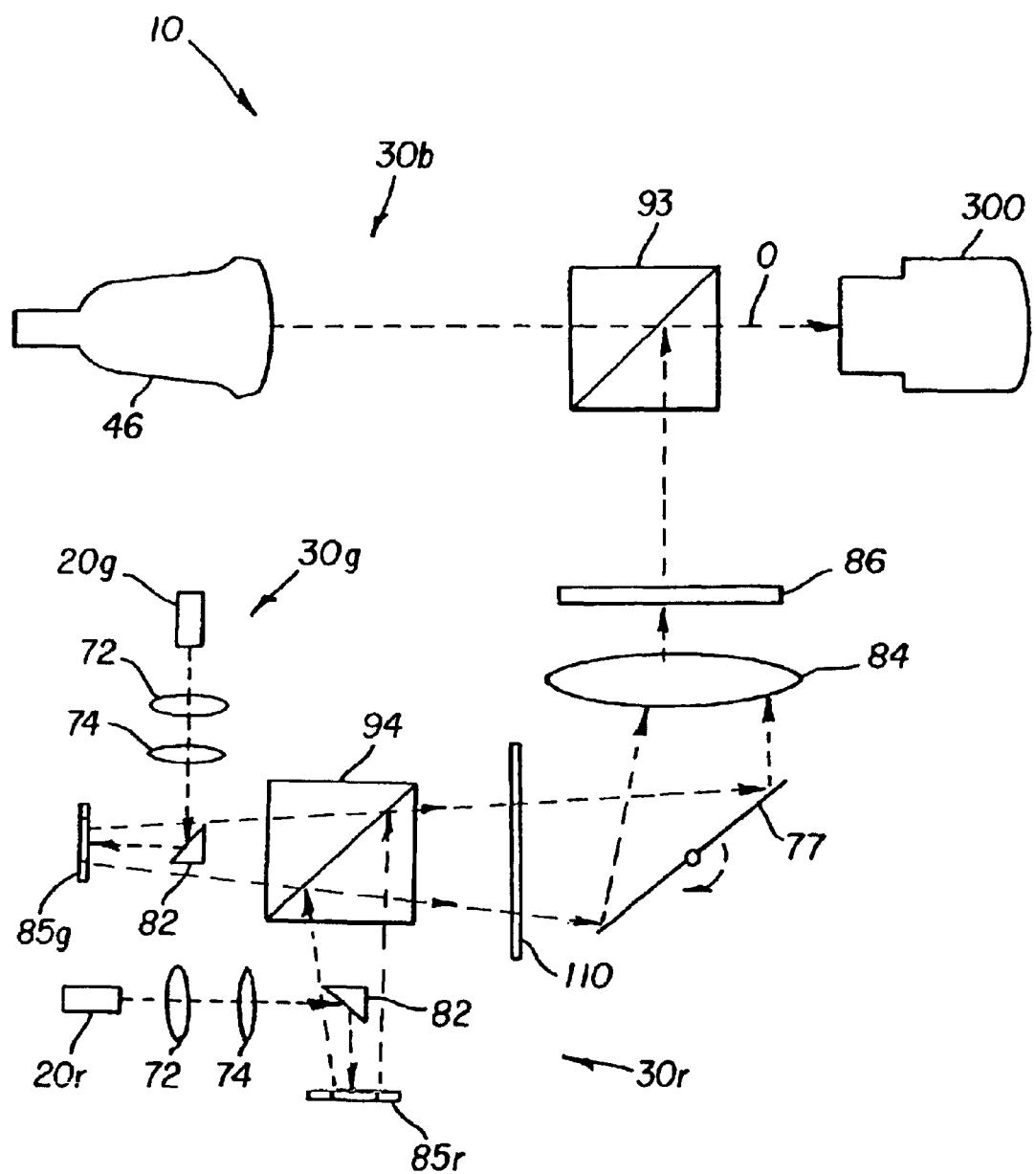
FIG. 3f is a detailed schematic block diagram showing an alternate embodiment of a display apparatus wherein one color modulation path employs an emissive display device and a second modulation path uses linear spatial light modulators to provide the other two colors from laser sources.

FIG. 3f shows another embodiment of display apparatus 10 in which an emissive display 46 is used in color modulation channel 30b. Emissive display 46 could be a cathode ray tube (CRT), an organic light emitting diode (OLED), a polymer light emitting diode (PLED), or a plasma display device, for example. This novel arrangement may be advantageous where it is not necessary to have the same resolution for blue color modulation channel 30b and red and green color modulation channels 30r and 30g. Polarizing beamsplitter 93 or some other combiner is used for combining the imaged light output for projection lens 300.

Figure 4:
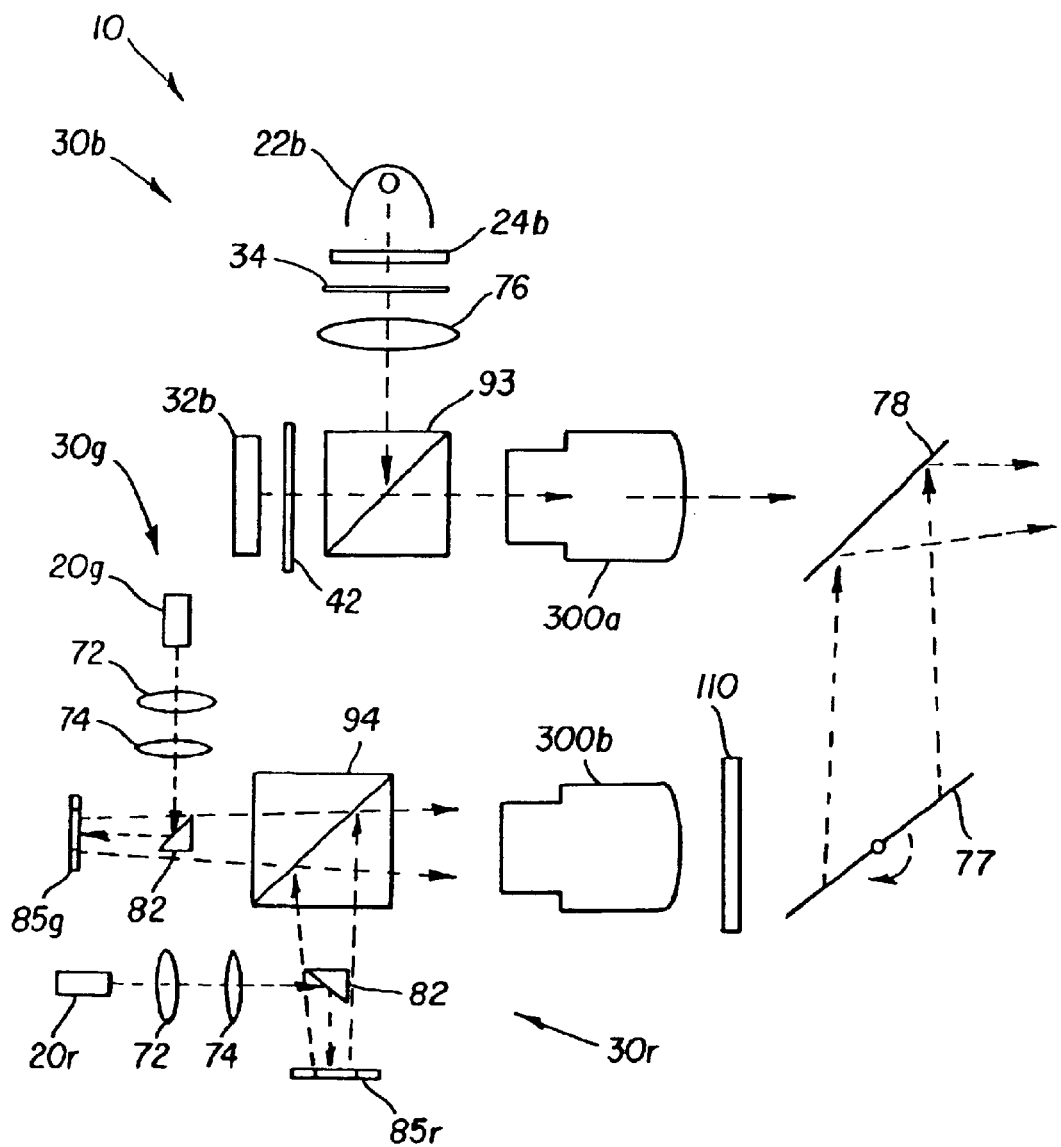
FIG. 4 is a detailed schematic block diagram showing an alternate embodiment of a display apparatus using multiple projection lenses.

Referring to FIG. 4, there is shown an alternative embodiment of display apparatus 10 in which different projection paths are used for different colors. Here, blue color modulation channel 30b directs modulated light to a first projection lens 300a. Red and green color modulation channels 30r and 30g direct light to a second projection lens 300b. Optional cross-order filter 110 provides filtering of the projected red and green linear modulated light, which then travels to scanning mirror 77 and is combined, at a dichroic combiner 78, with blue modulated light projected from blue color modulation channel 30b. Dichroic combiner 78 is optional, since first and second projection lenses 300a and 300b could be separately focused onto display surface 90 (not shown in FIG. 4), with appropriate modifications to the overall layout. The use of multiple projection lenses 300a and 300b could also be advantageous with any of the embodiments shown in FIGS. 3a–3f described above, since it simplifies optical requirements for projecting imaged light from different types of modulation devices.

Figure 5:
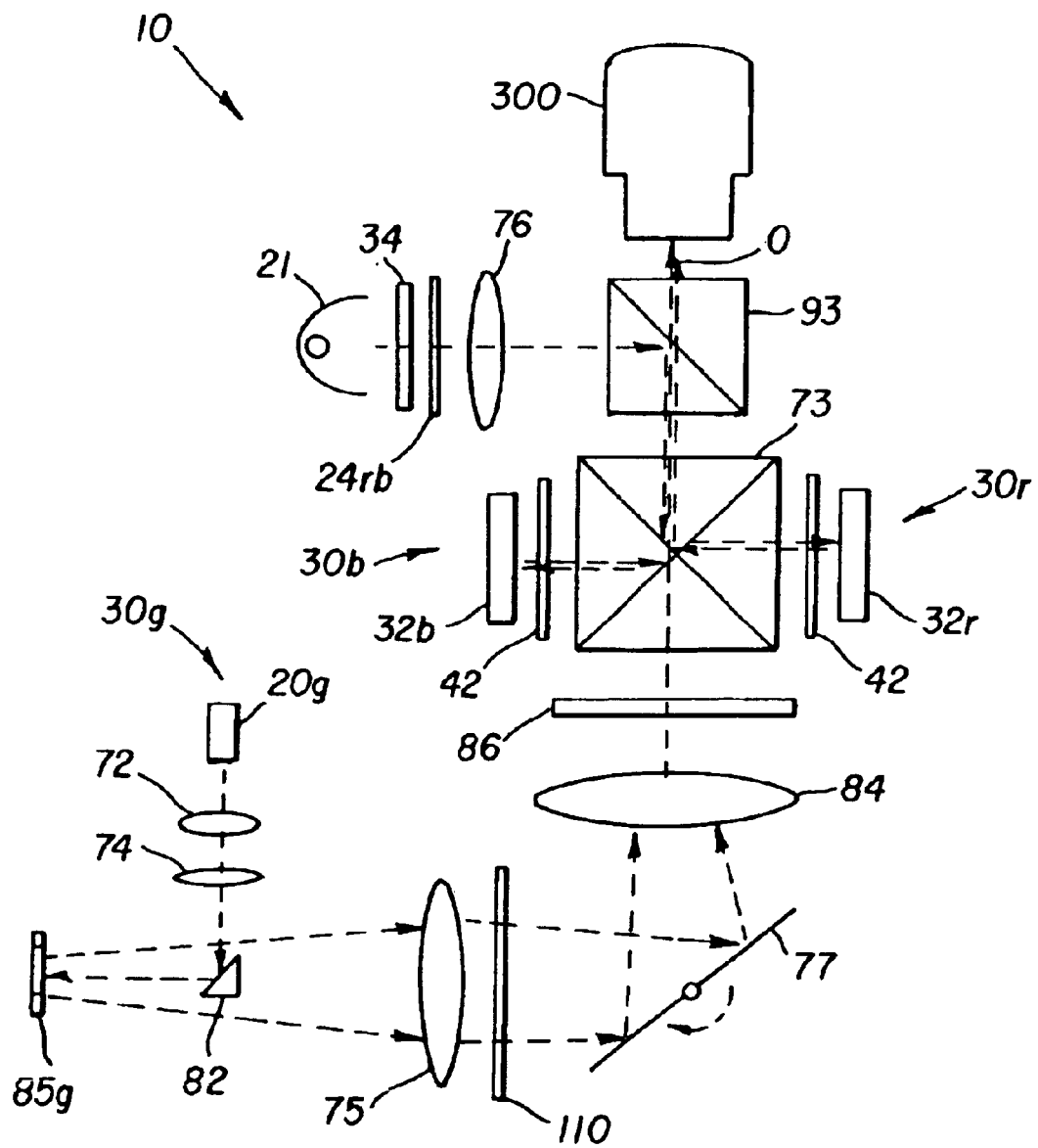
FIG. 5 is a detailed schematic block diagram showing yet another alternative embodiment of a display apparatus using a combination of different types of modulation components.

As is noted in the background material above, a primary motivation for using lasers on some color modulation channels and other light sources on other color modulation channels relates to the high cost of lasers at some wavelengths. FIGS. 3a, 3b, 3c, 3d, 3e, 3f, and 4 show embodiments using two laser sources 20g, 20r. However, there may be situations where it is advantageous to use a laser on only one color channel, with incoherent light sources on the other channels. Referring to FIG. 5, there is shown an alternative embodiment of display apparatus 10 wherein green color modulation channel 30g uses green laser source 20g. Red and blue color modulation channels 30r and 30b use a lamp 21 as an incoherent light source. The specific lamp 21 chosen has significant red and blue wavelength components. Light from lamp 21 travels to optional polarizer 34 and is filtered at a red-blue pass filter 24rb. The polarized red and blue source light is then directed by lens 76 to a polarizing beamsplitter 93 which reflects light having the proper polarization to color combiner 73. For this unmodulated light, color combiner 73 also acts as a color separator, diverting the unmodulated incoherent red light to reflective spatial light modulator 32r, through optional quarter-wave plate 42. Similarly, color combiner 73 diverts modulated incoherent blue light to reflective spatial light modulator 32b, through optional quarter-wave plate 42. Modulated red light from spatial light modulator 32r is then combined by color combiner 73 with modulated blue light from spatial light modulator 32b and with modulated coherent green light from green color modulation channel 30g. Polarizing beamsplitter 93 then transmits the combined modulated light to projection lens 300. Color combiner 73 could be an X-cube in one embodiment. As is well known in the imaging arts, X-cubes are optimized for different polarization states at different wavelengths. In standard configurations, the X-cube reflects red and blue light having S-polarization and transmits green light having P-polarization. However, for maximum brightness, it may be advantageous to use an X-cube that is fabricated to be substantially polarization-insensitive.

The embodiments shown in FIGS. 3a, 3b, 3c, 3d, 3e, and 4 show incoherent light source 22b used for blue light, with lasers 20r used for red light. Alternative incoherent light sources could be used for red and/or blue illumination, such as LEDs, for example.

Figure 6:
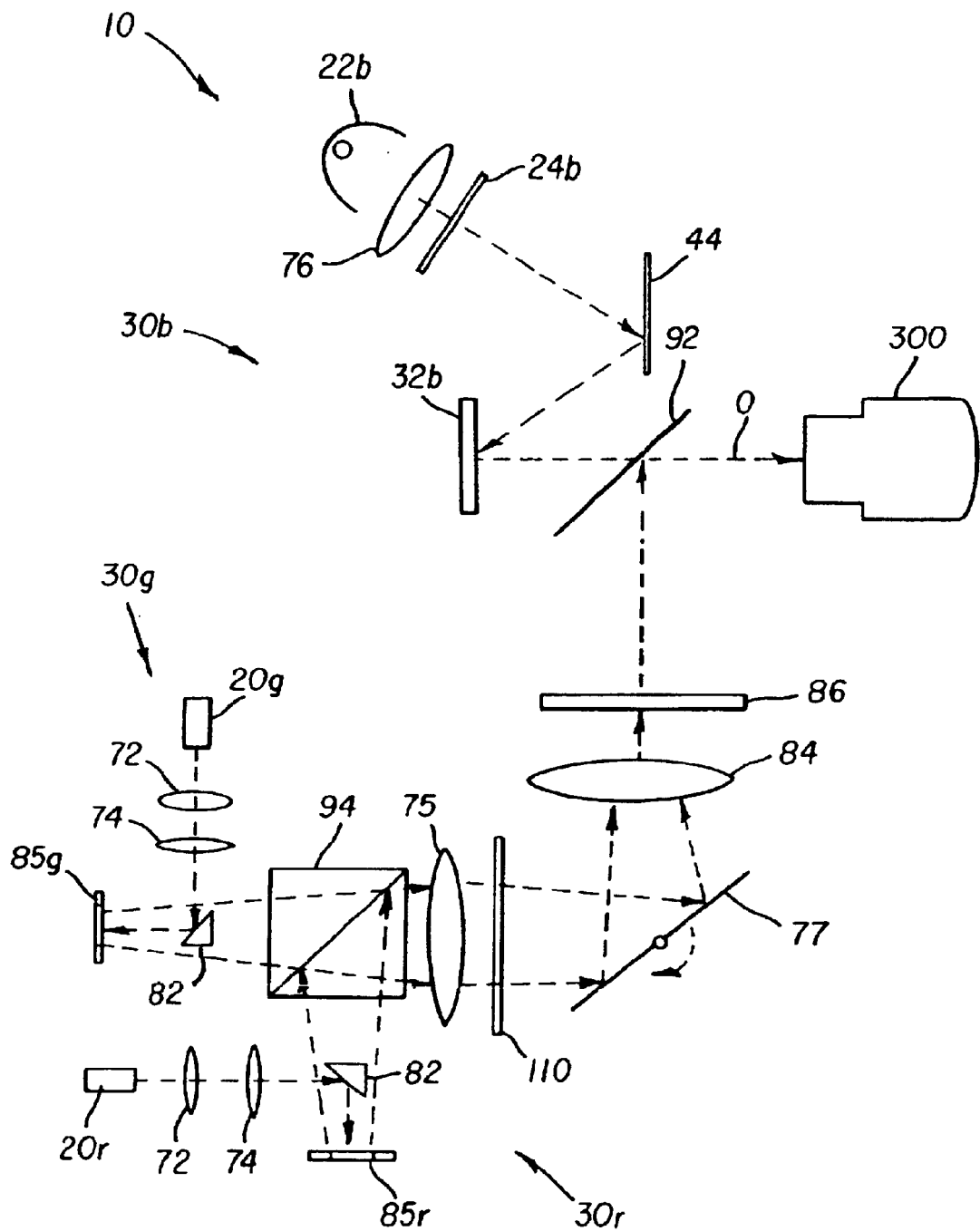
FIG. 6 is a detailed schematic block diagram showing yet another alternative embodiment of a display apparatus using a DMD spatial light modulator on one color channel and GEMS spatial light modulators on other color channels; and, FIG. 7 is a graph showing the improvement of color gamut available using the apparatus and methods of the present invention.

Referring to FIG. 6, there is shown another embodiment of the present invention, in which spatial light modulator 32b for blue color modulation channel 30b is a Digital Micromirror Device (DMD). In the configuration of FIG. 6, incoherent light source 22b provides illumination directed by lens 76 through blue-pass filter 24b and reflected by a mirror 44 to spatial light modulator 32b at the proper angle for modulation. Dichroic combiner 92 combines the modulated light from blue color modulation channel 30b with the scanned line of modulated light from red and green color modulation channels 30r and 30g and directs this combined light to projection lens 300.

Color Gamut

Figure 1:
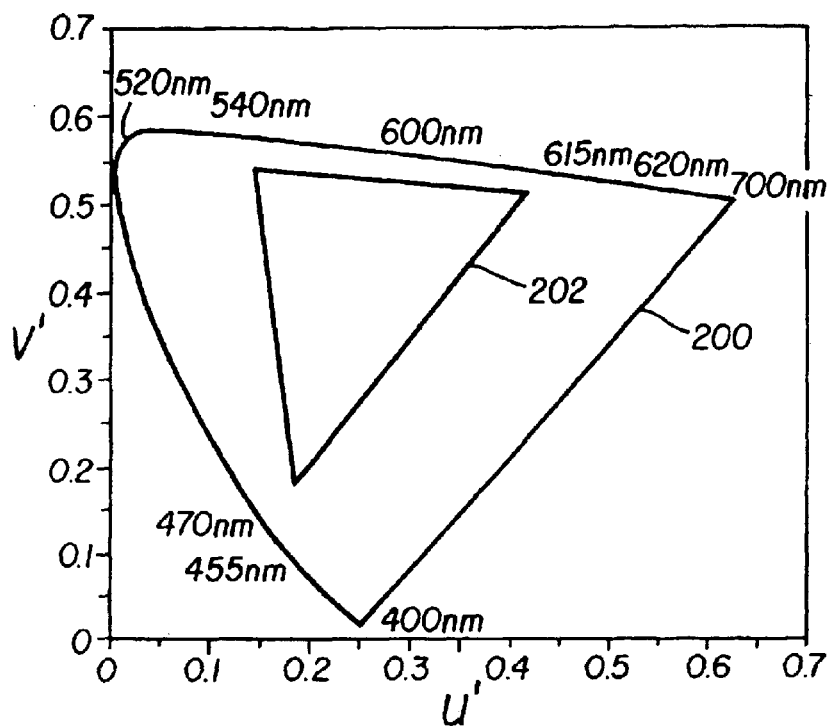
FIG. 1 is a graph showing the relationship of the standard SMPTE color gamut to the visible color gamut.

As is noted in the background information given above, one key motivation for using monochromatic laser illumination sources relates to color gamut. Referring back to FIG. 1, it was noted that optimum color gamut is achieved when vertices that define device gamut 202 are on the curve of visible gamut 200. Laser sources provide vertices on the visible gamut 200 curve; other light sources typically provide vertices somewhat back from the visible gamut 200 curve.

Figure 7:
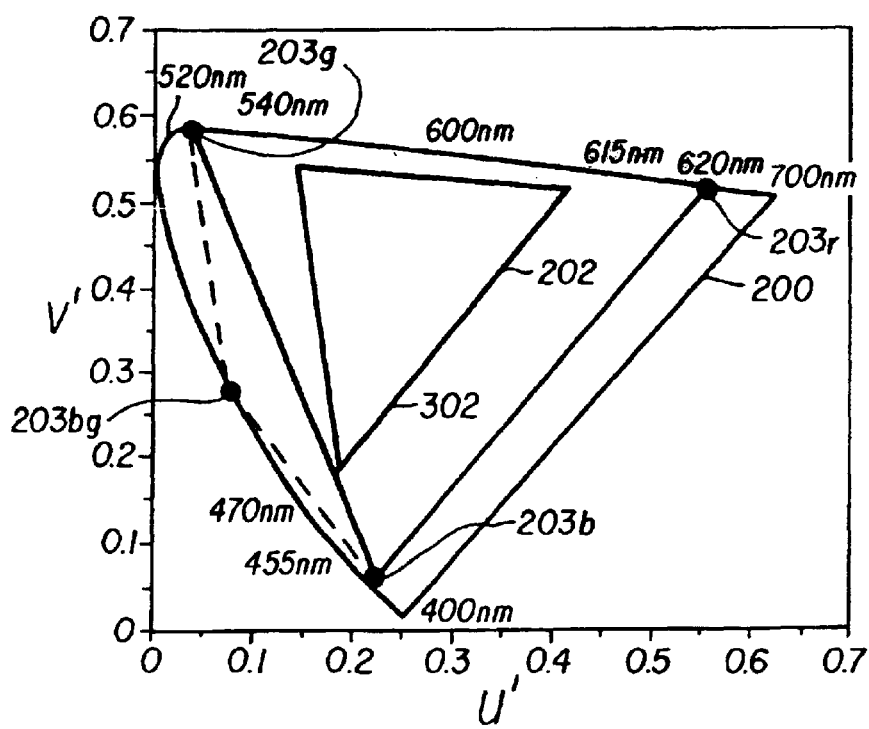

Referring to FIG. 7, there is shown a graph of an improved color gamut 302 using red laser source 20r to provide red vertex 203r, green laser source 20g to provide green vertex 203g, and blue light source 22b to provide blue vertex 203b. Blue light source 22b is preferably an arc lamp having a stable 436 nm wavelength output. As has been described, red and green vertices 203r and 203g are on the periphery of visible gamut 200. Blue vertex 203b, although not directly on this periphery, is very near represented in FIG. 7. Note the considerable enlargement of improved color gamut 302 of the present invention over device gamut 202 available using standard SMPTE phosphors. Thus, while the method of the present invention does not yield the maximum possible color gamut obtainable according to the tri-vertex CIE model, the improvement available using the present invention can be substantial.

As is noted above with reference to FIG. 3e, expanded color gamut can be obtained by supplementing the conventional red, green, and blue light sources with additional monochromatic sources of other colors. Referring to FIG. 3e, the configuration of display apparatus 10 allows a broadened color gamut, effectively adding a fourth vertex 203bg (see FIG. 7), which may be emitted light in the blue-green region, for example, for defining a larger device gamut 202, as is represented in FIG. 7.

Optical Path Design

It must be observed that there are differences in handling the different types of modulated light provided by linear and area spatial light modulators. The method of the present invention may require that some compromises be made in order to accommodate both scanned linear and full area imaging. This is in addition to other changes required between color paths to handle light at different wavelengths, for example.

It has been observed that the modulated image provided by blue color modulation channel 30b is provided as a full image frame, as distinguished from the scanned linear light for red or green color modulation channels 30r and 30g. Moreover, also contrary to convention, the blue image itself may even be at lower resolution than the modulated images provided in red and green color modulation channels 30r and 30g. Because human eye sensitivity to detail is limited in the blue visible region, resolution requirements can be relaxed for blue color modulation channel 30b. With this same consideration, the optical path for modulated light can also be optimized for red and green color imaging where detail (and, to some extent, chromaticity) is more important.

FIGS. 3a, 3b, 3c, 3d, 3e, 3f and 4 show and describe the use of GEMS devices as linear light modulators. However, GLV or other linear devices could alternately be used, provided with the necessary changes to support components, as is well known in the imaging arts.

Optical Component Options

It must be pointed out that FIGS. 2, 3a, 3b, 3c, 3d, 3e, 3f, 4, 5, and 6, show only the components of display apparatus 10 that are used for color modulation. Scanning, projection, and display functions can use components well-known to those skilled in the digital image display arts. Scanning mirror 77 is the simplest of a set of possible devices for scanning the image, one line at a time, toward display surface 90. However, other types of scanning elements could be used, such as a rotating polygon, for example.

Color combiners 73 typically comprise one or more dichroic surfaces that have been fabricated for reflecting or transmitting light at various wavelengths. FIGS. 2 and 5 show X-cubes or X-prisms that operate based on crossed dichroic surfaces, used for color combiner 73. However, other arrangements of color-combining dichroic surfaces may alternatively be used for directing multiple input colors into a single output color path.

In one embodiment, display surface 90 is a front projection screen; however, a rear-projection screen or other surface could also be used.

It can be seen that the apparatus and method of the present invention provide a solution to a recognized problem that has heretofore limited the feasibility of economical laser-based projection systems. Moreover, the solution of the present invention provides display apparatus 10 with an expanded color gamut, closely approximating the color gamut that would be achievable with an all-laser illumination system, yet, at a fraction of the cost of such a system. Finally, in contradistinction to conventional approaches for digital imaging, the method and apparatus of the present invention employ different types of spatial light modulators in different color channels of a single projection system, with the added option of using lower resolution in the blue color channel where detail is less perceptible.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, specific components in red, green, and blue color modulation channels 30r, 30g, and 30b, respectively, can be varied to suit the type of image modulation being performed. More than 3 or 4 color channels could be employed, such as where additional colors would enhance the available color gamut, as is disclosed in U.S. patent application Ser. No. 10/272,594, by Agostinelli et al., filed Oct. 16, 2002, titled "Broad Gamut Color Display Apparatus Using An Electromechanical Grating Device."

Parts List

10 display apparatus
20bg laser source, fourth color
20g laser source, green
20r laser source, red
21 lamp
22b light source, blue
24b blue-pass filter
24rb red-blue pass filter
30b color modulation channel, blue
30bg color modulation channel, fourth color
30g color modulation channel, green
30r color modulation channel, red
30rg color modulation channel, red-green
32b spatial light modulator, blue
32g spatial light modulator, green
32r spatial light modulator, red
34 polarizer
42 quarter-wave plate
44 mirror
46 emissive display
72 spherical lens
73 color combiner
74 cylindrical lens
75 lens
76 lens
77 scanning mirror
78 dichroic combiner
82 turning mirror
84 scan lens
85bg electromechanical grating light modulator, fourth color
85g electromechanical grating light modulator, green Parts List—Continued

85r electromechanical grating light modulator, red
85rg electromechanical grating light modulator, red-green
86 diffuser
87rg dual electromechanical grating light modulator
89 compensation elements
90 display surface
92 dichroic combiner
93 polarizing beamsplitter
94 dichroic combiner
96 X-cube
110 cross-order filter
200 visible gamut
202 device gamut
203b vertex, blue
203bg g fourth vertex
203g vertex, green
203r vertex, red
300 projection lens
300a first projection lens
300b second projection lens
302 improved device gamut

What is claimed is:

1. A display apparatus for forming, on a display surface, a color image including a plurality of superimposed color images, the display apparatus comprising:
    (a) a first color modulation channel for forming a first color two-dimensional image, comprising:
        (a1) a laser light source for providing a first color source beam;
        (a2) a linear spatial light modulator for modulating said first color source beam to provide a modulated light beam having a first color;
        (a3) a scanning element for scanning said modulated light beam having said first color to form said first color two-dimensional image;
    (b) a second color modulation channel for forming a second color two-dimensional image, comprising:

(b1) an incoherent light source for providing a second color source beam;
(b2) an area spatial light modulator for modulating said second color source beam to form a second color two-dimensional image; and
(c) at least one projection lens for projecting, toward the display surface, the color image comprising said first color two-dimensional image combined with said second color two-dimensional image.

2. The display apparatus according to claim 1, further comprising a color combiner for combining at least said first and said second color two-dimensional images for projection.

3. The display apparatus according to claim 2, wherein said color combiner includes at least one dichroic surface.

4. The display apparatus according to claim 2, wherein said color combiner is selected from the group consisting of a dichroic combiner, a polarization beamsplitter, an X-cube, and a Philips prism.

5. The display apparatus according to claim 1, wherein said first color source beam is green.

6. The display apparatus according to claim 1 wherein said linear spatial light modulator is selected from the group consisting of GEMS and GLV devices.

7. The display apparatus according to claim 6, wherein said first color modulation channel further comprises an obstructing element for blocking a zeroeth order light beam reflected from said linear spatial light modulator from reaching the display surface.

8. The display apparatus according to claim 7, wherein said obstructing element is also used for directing said first color source beam toward said linear spatial light modulator.

9. The display apparatus according to claim 1, further comprising a color separator for separating said second color source beam from said incoherent light source.

10. The display apparatus according to claim 9, wherein said color separator includes a dichroic surface.

11. The display apparatus according to claim 1, wherein said area spatial light modulator is selected from the group consisting of a transmissive LCD, a reflective LCD, and a digital micromirror device.

12. The display apparatus according to claim 1, wherein said incoherent light source includes an arc lamp.

13. The display apparatus according to claim 1, wherein said incoherent light source includes an LED.

14. The display apparatus according to claim 1, wherein said scanning element includes a mirrored surface.

15. The display apparatus according to claim 1, wherein the display surface is selected from the group consisting of front projection screens and rear projection screens.

16. The display apparatus according to claim 1, wherein said scanning element is selected from the group consisting of a mirror and a mirrored polygon.

17. The display apparatus according to claim 1, wherein said second color source beam is blue.

18. The display apparatus according to claim 17, wherein said second color two-dimensional image has a lower pixel resolution than said first color two-dimensional image.

19. The display apparatus according to claim 1, wherein said area spatial light modulator has a lower pixel resolution than said linear light modulator.

20. A display apparatus for forming, on a display surface, a color image including a plurality of superimposed images, the display apparatus comprising:
(a) a first color modulation channel for forming a first two-dimensional image, comprising:
(a1) a first laser light source for providing a source laser beam;
(a2) a first linear spatial light modulator for modulating said source laser beam to provide at least one modulated light beam having a first color;
(a3) a scanning element for directing, toward a first color combiner, a scanned line image beam comprising said at least one modulated light beam having said first color;
(b) a second color modulation channel for forming a second two-dimensional image, comprising:
(b1) a first incoherent light source for providing a second color source beam;
(b2) a first area spatial light modulator for modulating said second color source beam to provide a second color image beam to said first color combiner;
(c) said first color combiner combining at least said scanned line image beam and said second color image beam to form a superimposed color image beam; and
(d) a projection lens for projecting said superimposed color image beam toward the display surface.

21. The display apparatus according to claim 20, further comprising:
(e) a third color modulation channel for forming a third two-dimensional image, comprising:
(e1) a second laser light source for providing a third color source beam;
(e2) a second linear spatial light modulator for modulating said third color source beam to provide at least one modulated light beam having a third color; and
(e3) a second color combiner for combining said at least one modulated light beam having said third color with said at least one modulated light beam having said first color.

22. The display apparatus according to claim 21, wherein a single component includes said first linear spatial light modulator disposed adjacent to said second linear spatial light modulator.

23. The display apparatus according to claim 20 further comprising:
(e) a third color modulation channel for forming a third two-dimensional image, comprising:
(e1) a second incoherent light source for providing a third color source beam; and
(e2) a second area spatial light modulator for modulating said third color source beam to provide a third color image beam to said color combiner; said color combiner further combining said third color image beam with said scanned line image beam and said second color image beam to form a superimposed multicolor image beam.

24. The display apparatus according to claim 20, wherein said source laser beam is green.

25. The display apparatus according to claim 20, wherein said first linear spatial light modulator is selected from the group consisting of GEMS and GLV devices.

26. The display apparatus according to claim 25, wherein said first color modulation channel further comprises an obstructing element for blocking a zeroth order light beam reflected from said first linear spatial light modulator from reaching the display surface.

27. The display apparatus according to claim 26, wherein said obstructing element is also used for directing said first color source beam toward said first linear spatial light modulator.

28. The display apparatus according to claim 20, further comprising a color filter for providing said second color source beam from said first incoherent light source.

29. The display apparatus according to claim 20, further comprising a dichroic separator for separating said second color source beam from said first incoherent light source.

30. The display apparatus according to claim 20, wherein said first area spatial light modulator is selected from the group consisting of a transmissive LCD, a reflective LCD, and a digital micromirror device.

31. The display apparatus according to claim 20, wherein said first incoherent light source is an arc lamp.

32. The display apparatus according to claim 20 wherein said scanning element includes a mirrored surface.

33. The display apparatus according to claim 20, wherein said color combiner includes at least one dichroic surface.

34. The display apparatus according to claim 20, wherein the display surface is selected from the group consisting of front projection screens and rear projection screens.

35. The display apparatus according to claim 20, wherein said scanning element is selected from the group consisting of a mirror and a mirrored polygon.

36. The display apparatus according to claim 20, wherein said color combiner is selected from the group consisting of a dichroic combiner, a polarization beamsplitter, an X-cube, and a Philips prism.

37. The display apparatus according to claim 20, wherein said second color source beam is blue.

38. The display apparatus according to claim 20, wherein said first area spatial light modulator has a lower pixel resolution than said first linear light modulator.

39. The display apparatus according to claim 20, wherein said first color modulation channel further comprises:
   (a) a second laser light source for providing an alternative color source beam; and
   (b) means for modulating said source laser beam with said first linear spatial light modulator and means for combining said alternative color source beam from said second laser light source onto a common optical axis with light from said first laser light source.

40. The display apparatus according to claim 39, wherein said source laser beam is alternately from said first laser light source and said second laser light source.

41. A system for forming, on a display surface, a color image including a plurality of superimposed images, the system comprising:
   (a) a first color modulation channel for forming a first two-dimensional image, comprising:
      (a1) means for providing a source laser beam;
      (a2) means for modulating said source laser beam to provide at least one modulated light beam having a first color;
      (a3) means for directing, toward a color combiner, a scanned line image beam including said at least one modulated light beam having said first color;
   (b) a second color modulation channel for forming a second two-dimensional image, comprising:
      (b1) means for providing a second color incoherent source beam;
      (b2) means for modulating said second color incoherent source beam to provide a second color image beam to said color combiner;
   (c) said color combiner combining at least said scanned line image beam and said second color image beam to form a superimposed color image beam; and
   (d) means for projecting said superimposed color image beam toward the display surface.

42. A display apparatus for forming, on a display surface, a color image as a plurality of superimposed images, the display apparatus comprising:
   (a) a linear image modulation channel for forming a polychromatic, scanned linear image beam, comprising:
      (a1) a first laser light source for providing a first color source beam;
      (a2) a first linear spatial light modulator for modulating said first color source beam to direct, towards a first color combiner, at least one modulated light beam having a first color;
      (a3) a second laser light source for providing a second color source beam;
      (a4) a second linear spatial light modulator for modulating said second color source beam to direct, towards said first color combiner, at least one modulated light beam having a second color;
      (a5) said first color combiner combining said modulated light beam having said first color and said modulated light beam having said second color to form a combined color modulated linear light beam and directing said combined color modulated linear light beam toward a first projection lens;
      (a6) said first projection lens directing said combined color modulated linear light beam toward a scanning element for forming said scanned linear image beam, said first projection lens projecting said scanned linear image beam toward the display surface;
   (b) an area image modulation channel for forming an area image beam, comprising:
      (b1) an incoherent light source for providing an area source beam;
      (b2) a first area spatial light modulator for modulating said area source beam to provide said area image beam; and
      (b3) a second projection lens for projecting said area image beam toward the display surface.

43. The display apparatus according to claim 42 further comprising a second color combiner for combining said scanned linear image beam and said area image beam when projected toward the display surface.

44. The display apparatus according to claim 43, wherein said second color combiner is selected from the group consisting of an X-cube, a polarization beamsplitter, and a Philips prism.

45. The display apparatus according to claim 43, wherein said area image modulation channel further comprises:
   (a) a color separator for obtaining, from said incoherent light source, a fourth color source beam;
   (b) a third color combiner for combining said fourth color source beam onto a common axis with said area source beam; and
   (c) said area spatial light modulator alternately modulating said fourth color source beam and said area source beam to provide said area image beam.

46. The display apparatus according to claim 42, wherein said first color source beam is green.

47. The display apparatus according to claim 42 wherein said first linear spatial light modulator is selected from the group consisting of GEMS and GLV devices.

48. The display apparatus according to claim 47 further comprising an obstructing element for blocking a zeroth order light reflected from said first linear spatial light modulator from reaching the display surface.

49. The display apparatus according to claim 48, wherein said obstructing element is also used for directing said first color source beam toward said first linear spatial light modulator.

50. The display apparatus according to claim 42 further comprising a color filter for conditioning said area source beam from said incoherent light source.

51. The display apparatus according to claim 42 further comprising a dichroic separator for separating said area source beam from said incoherent light source.

52. The display apparatus according to claim 42, wherein said area spatial light modulator is selected from the group consisting of a transmissive LCD, a reflective LCD, and a digital micromirror device.

53. The display apparatus according to claim 42, wherein said incoherent light source is selected from the group consisting of an arc lamp and an LED.

54. The display apparatus according to claim 42, wherein said scanning element includes a mirrored surface.

55. The display apparatus according to claim 42, wherein said first color combiner includes at least one dichroic surface.

56. The display apparatus according to claim 42, wherein the display surface is selected from the group consisting of front projection screens and rear projection screens.

57. The display apparatus according to claim 42, wherein said scanning element is taken from the group consisting of a mirror, a mirrored polygon.

58. The display apparatus according to claim 42 wherein said first color combiner is selected from the group consisting of a dichroic combiner, an X-cube, a polarization beamsplitter, and a Philips prism.

59. The display apparatus according to claim 42, wherein said area source beam is blue.

60. The display apparatus according to claim 42, wherein said area spatial light modulator has a lower pixel resolution than said first linear spatial light modulator.

61. The display apparatus according to claim 42, wherein said linear image modulation channel in part (a5), further comprises:
 (i) a third laser light source for providing a fourth color source beam;
 (ii) a third linear spatial light modulator for modulating said fourth color source beam to direct, towards said first color combiner, at least one modulated light beam having a fourth color; and
 (iii) said first color combiner further combining said at least one modulated light beam having said fourth color with said at least one modulated light beam having said first color and said at least one modulated light beam having said second color to form said combined color modulated linear light beam and directing said combined color modulated linear light beam toward said first projection lens.

62. The display apparatus according to claim 42, wherein said area image modulation channel further comprises:
 (a) a color separator for obtaining, from said incoherent light source, a fourth color source beam;
 (b) a second area spatial light modulator for modulating said fourth color source beam to provide a modulated fourth color image beam; and
 (c) a second color combiner for directing said modulated fourth color source beam into said area image beam for projection by said second projection lens.

63. A display apparatus for forming, on a display surface, a color image comprising a plurality of superimposed color images, the display apparatus comprising:
 (a) a first color modulation channel for forming a first color two-dimensional image, comprising:
  (a1) a laser light source for providing a first color source beam;
  (a2) a linear spatial light modulator for modulating said first color source beam to provide a modulated light beam having a first color;
  (a3) a scanning element for scanning said modulated light beam having said first color to form said first color two-dimensional image;
 (b) a second color modulation channel comprising an emissive display for forming a second color two-dimensional image; and
 (c) at least one projection lens for projecting, toward the display surface, the color image comprising said first color two-dimensional image superimposed with said second color two-dimensional image.

64. The display apparatus according to claim 63, wherein said emissive display is selected from the group consisting of a CRT display, an OLED display, a PLED display, and a plasma display device.

65. A display apparatus for forming, on a display surface, a color image comprising a plurality of superimposed color images, the display apparatus comprising:
 (a) a first color modulation channel for forming a green two-dimensional image, comprising:
  (a1) a laser light source for providing a green source beam;
  (a2) a first spatial light modulator for modulating said green source beam to form said green two-dimensional image having a first resolution;
 (b) a second color modulation channel for forming a second color two-dimensional image, comprising:
  (b1) an incoherent light source for providing a second color source beam;
  (b2) an area spatial light modulator for modulating said second color source beam to form a second color two-dimensional image having a second resolution, wherein said first resolution is greater than said second resolution; and
 (c) at least one projection lens for projecting, toward the display surface, the color image comprising said green two-dimensional image superimposed with said second color two-dimensional image.

66. The display apparatus according to claim 65, wherein said first spatial light modulator is a linear spatial light modulator.

67. The display apparatus according to claim 65, wherein said first spatial light modulator is selected from the group consisting of a GEMS device and a GLV device.

68. The display apparatus according to claim 65, wherein said first spatial light modulator is an area spatial light modulator.

69. The display apparatus according to claim 65, wherein said first spatial light modulator is selected from the group consisting of a reflective LCD, a transmissive LCD, and a DMD.

70. A method for forming, on a display surface, a color image as a plurality of superimposed images, comprising the steps of:
 (a) forming a first color linear image beam including the steps of:
  (a1) providing a first color laser source beam;
  (a2) modulating said first color laser source beam to provide at least one diffracted light beam having a first color;
 (b) forming a second color two-dimensional image beam including the steps of:
  (b1) providing a second color source beam from an incoherent light source;
  (b2) modulating said second color source beam;
 (c) combining said first color linear image beam with said second color two-dimensional image beam to form a superimposed image beam; and (d) projecting said superimposed image beam toward the display surface.

71. The method for forming a color image according to claim 70, wherein the step of modulating said first color laser source comprises the step of modulating a GEMS device.

72. The method for forming a color image according to claim 70, wherein the step of modulating said first color laser source comprises the step of modulating a GLV device.

73. The method for forming a color image according to claim 70, wherein the step of providing a first color laser source beam comprises the step of providing a green laser beam.

74. The method for forming a color image according to claim 70, wherein the step of modulating said second color source beam comprises the step of modulating a spatial light modulator.

75. The method for forming a color image according to claim 70 further comprising the steps of:
   (e) forming a third color linear image beam including the steps of:
      (e1) providing a third color laser source beam;
      (e2) modulating said third color laser source beam to provide at least one diffracted light beam having a third color; and
   (f) combining said third color linear image beam into said superimposed image beam for projection.

76. A method for forming a color image as a plurality of superimposed two-dimensional images, comprising the steps of:
   (a) forming a first color two-dimensional image including the steps of:
      (a1) providing a first color laser source beam;
      (a2) modulating said first color laser source beam to provide a modulated light beam having a first color;
      (a3) scanning said modulated light beam having said first color to form said first color two-dimensional image;
   (b) forming a second color two-dimensional image including the steps of:
      (b1) providing a second color source beam from an incoherent light source;
      (b2) modulating said second color source beam to form a second color two-dimensional image; and
   (c) projecting the color image comprising said first color two-dimensional image superimposed with said second color two-dimensional image.

77. The method for forming a color image according to claim 76 further comprising the step of combining at least said first and said second color two-dimensional images to form, along a projection axis, a superimposed color image for projection.

78. The method for forming a color image according to claim 76, wherein the step of providing a second color source beam comprises the step of using a color separator for isolating said second color source beam from said incoherent light source.

79. The method for forming a color image according to claim 76, wherein the step of modulating said first color laser source beam comprises the step of modulating a GEMS device.

80. The method for forming a color image according to claim 76, wherein the step of modulating said first color laser source beam comprises the step of modulating a GLV device.

81. The method for forming a color image according to claim 76, wherein the step of providing a first color laser source beam comprises the step of providing a green laser beam.

82. The method for forming a color image according to claim 76, wherein the step of modulating said second color source beam comprises the step of modulating a spatial light modulator.

83. The method for forming a color image according to claim 76 further comprising the steps of
   (d) forming a third color two-dimensional image including the steps of:
      (d1) providing a third color laser source beam;
      (d2) modulating said third color laser source beam to provide a modulated light beam having a third color;
      (d3) scanning said modulated light beam having said third color to form said third color two-dimensional image; and
   (e) projecting said third color two-dimensional image superimposed with the color image comprising said first color two-dimensional image superimposed with said second color two-dimensional image.

84. A method for forming, on a display surface, a color image as a plurality of superimposed two-dimensional images, comprising the steps of:
   (a) forming a polychromatic, scanned linear image beam including the steps of:
      (a1) providing a first color laser source beam;
      (a2) modulating said first color laser source beam to form at least one modulated light beam having a first color;
      (a3) providing a second color laser source beam;
      (a4) modulating said second color laser source beam to form at least one modulated light beam having a second color;
      (a5) combining said modulated light beam having said first color and said modulated light beam having said second color to form a combined color modulated linear light beam;
      (a6) directing said combined color modulated linear light beam toward a scanning element for forming said scanned linear image beam;
      (a7) projecting said scanned linear image beam toward the display surface;
   (b) forming an area image beam including the steps of:
      (b1) providing an area source beam from an incoherent light source;
      (b2) modulating said area source beam to provide said area image beam; and
      (b3) projecting said area image beam toward the display surface.

85. A method for forming, on a display surface, a color image as a plurality of superimposed two-dimensional images, comprising the steps of:
   (a) forming a first color two-dimensional image including the steps of:
      (a1) providing a first color laser source beam;
      (a2) modulating said first color laser source beam to provide a modulated light beam having a first color;
      (a3) scanning said modulated light beam having said first color to form said first color two-dimensional image;
   (b) activating an emissive imaging array device to form a second color two-dimensional image; and
   (c) projecting, toward the display surface, the color image comprising said first color two-dimensional image superimposed with said second color two-dimensional image.

* * * * *